(No Model.) 2 Sheets—Sheet 1.
A. J. MOXHAM.
APPARATUS FOR WELDING.
No. 508,036. Patented Nov. 7, 1893.
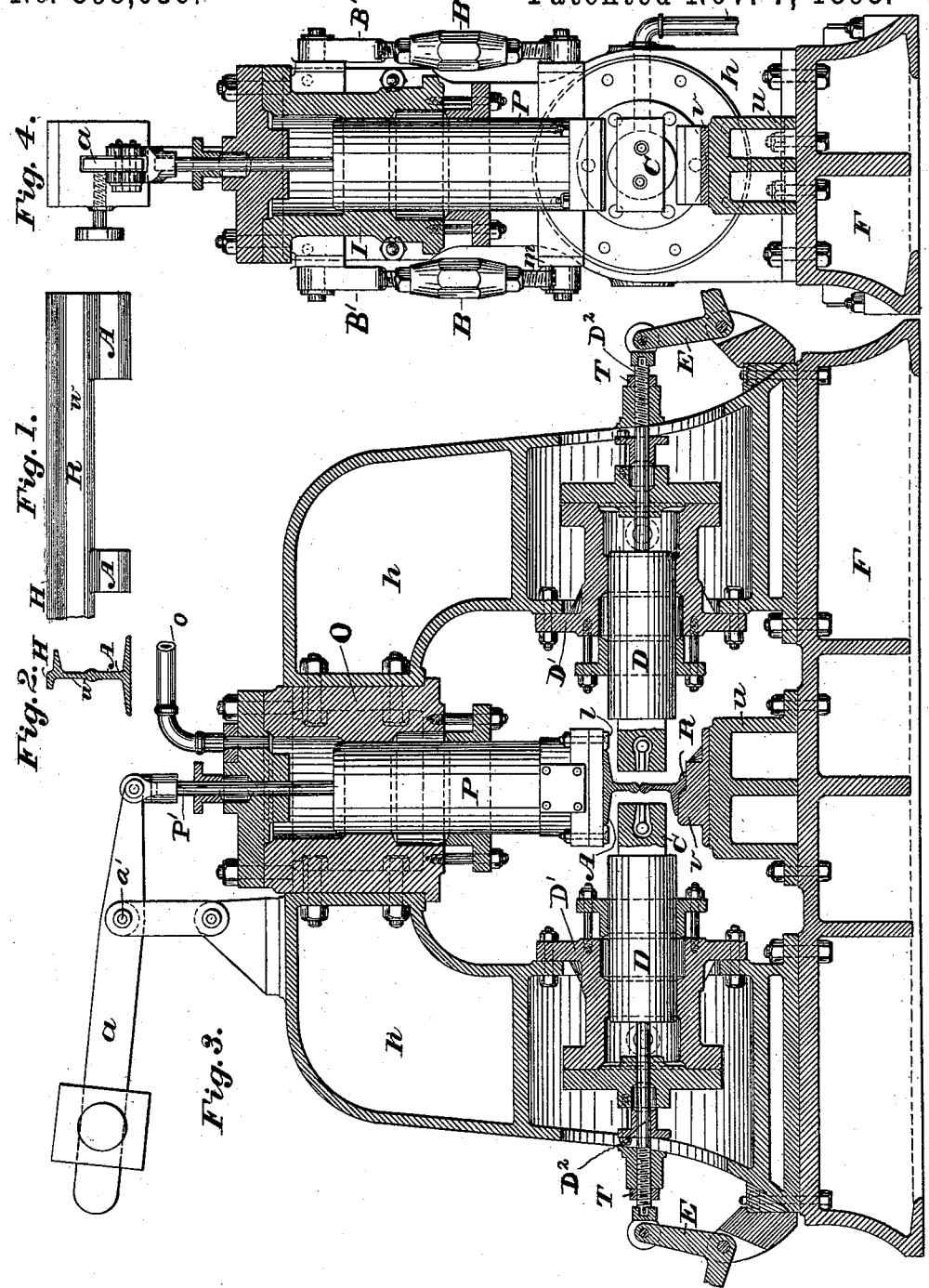
WITNESSES:
Francis P. Reilly
W. F. Brickel
INVENTOR
A. J. Moxham
BY R. N. Dyer
ATTORNEY.
THE NATIONAL LITHOGRAPHING COMPANY,
WASHINGTON, D. C.

(No Model.) 2 Sheets—Sheet 2.
A. J. MOXHAM.
APPARATUS FOR WELDING.
No. 508,036. Patented Nov. 7, 1893.
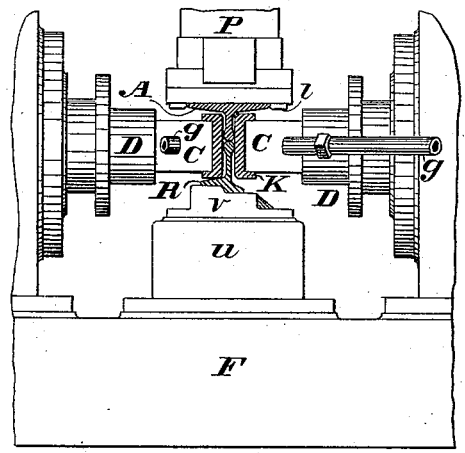
Fig. 6.
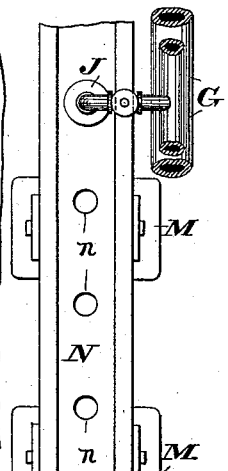
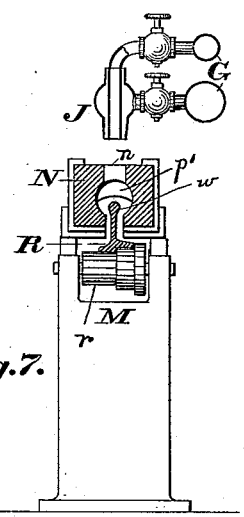
Fig. 7.
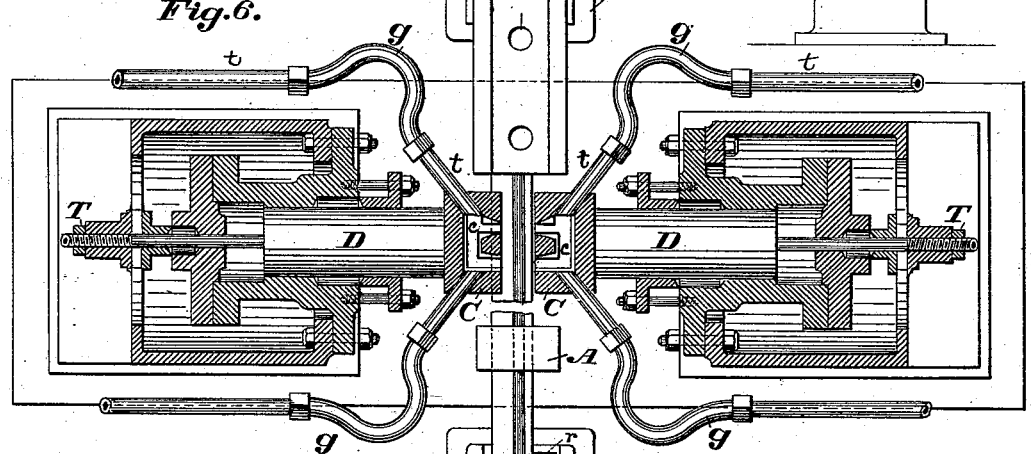
Fig. 5.
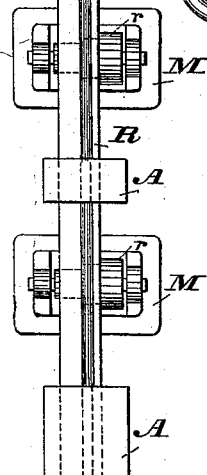
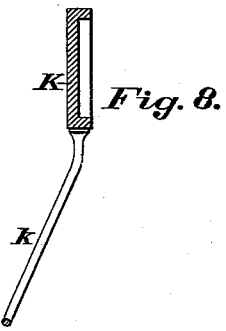
Fig. 8.
WITNESSES:
Francis P. Leiley
W. F. Brickel
INVENTOR
A. J. Moxham
BY
P. R. Voorhies
ATTORNEY.

UNITED STATES PATENT OFFICE.

ARTHUR J. MOXHAM, OF JOHNSTOWN, PENNSYLVANIA.

APPARATUS FOR WELDING.

SPECIFICATION forming part of Letters Patent No. 508,036, dated November 7, 1893.

Application filed December 26, 1891. Serial No. 416,130. (No model.)

*To all whom it may concern:*

Be it known that I, ARTHUR J. MOXHAM, of Johnstown, in the county of Cambria and State of Pennsylvania, have invented a new and useful Apparatus for Welding, which invention is fully set forth and illustrated in the following specification and accompanying drawings.

The object of this invention is to provide a machine for heating rails or other metal bars and simultaneously welding the same.

The invention will first be described in detail and then particularly set forth in the claims.

In the accompanying drawings: Figure 1, is a side view of part of a tramway rail having pedestals or supports welded thereto, which welding may be accomplished by means of the apparatus forming the subject of this invention. Fig. 2 is a transverse section of Fig. 1. Fig. 3 is a longitudinal section of a welding apparatus, constructed according to my invention. Fig. 4 is a transverse section of the machine shown in Fig. 3. Fig. 5 is a view in sectional plan of the machine. Figs. 6 and 7 are part side views of the machine illustrated in Fig. 5, showing different stages of the welding. Fig. 8 shows a certain detail hereinafter described.

In said figures the several parts are respectively indicated by reference letters as follows:—

The letter F indicates the base of the machine, upon which is fixed a framing $h$, carrying a vertical hydraulic cylinder O, provided with a plunger P. Said framing also carries two horizontal hydraulic cylinders D', provided with plungers D. The cylinders O, D', are respectively provided with pipes $o, p$, to permit the ingress and egress of water in any well known manner. The plunger P is limited in its down-stroke by two side links B', adjustable by screw nuts B, and is retracted by a counter-weighted lever $a$, fulcrumed at $a'$, and connected to the plunger rod P'. The plungers D are also limited in their forward strokes by nuts T on rods $D^2$, extending back from said plungers through stuffing boxes and connected to bell crank levers E, which levers may be weighted so as to retract said plungers. Attached to the plungers D are blocks C, provided with cavities $c$ and pipes $t$, to form burners, and connected by flexible tubes $g$, with gas and air pipes G.

Mounted upon standards M, located at intervals before and behind the welding press, is a series of rollers $r$, upon which the rail R to be welded may be run. The web $w$ of the rail projects, as shown in Fig. 7, into a tube or furnace N, of refractory material, through a slot along the bottom of said tube. The tube or furnace N, is mounted upon the standards M, and is provided on its upper side at suitable intervals, with holes $n$, through which holes jets from jet-pipes J, are directed into the tube N, from suitable gas and air pipes G, connected to any suitable source of supply.

The jets J and holes $n$ are conveniently arranged at intervals, say of a foot, and only such of the jets are lighted as correspond with the intended intervals between the rail-pedestals or supports. If, for instance, the pedestals to be welded to the rail should be at intervals of four feet, every fourth jet J is lighted so as to heat up the required parts of the rail, in succession, as the rail advances. Between each pair of the holes $n$, a partition $p'$, extending down nearly to the edge of the rail, is introduced to make the tube N, virtually in separate heating-chambers.

On a central pedestal $u$, is placed a die $v$, shaped to fit the head H of the rail shown in Figs. 1 and 2, which rail is placed on said die in an inverted position. The portion A which is to form the support or pedestal for the rail R is held against the face of the plunger P by clips $l$, or otherwise.

The operation of the machine is as follows: The short pieces to form the pedestals A are heated in a separate furnace or muffle arranged in convenient proximity to the welding press. The rail R, being advanced so as to bring between the blocks C, a part of it already heated in the tube N, and a pedestal piece A, also heated, being placed on the plunger P, said plunger is caused to descend and the edges of the rail R and pedestal A are thus pressed together. The plungers D are then advanced bringing the blocks C, C, almost to bear against the sides of the rail R and pedestal A when, the abutting edges of said rail and pedestal being highly heated by the burners in the blocks C, will be welded together. The plungers D are then withdrawn and facing dies K, Fig. 8, are held by long handles $k$ or otherwise, one in front of each of the blocks C as shown in Fig. 6. The plungers D are then again advanced pressing laterally on the welded joint and giving it a face-finish. The plungers D, are then again withdrawn, the clips, $l$, disengaged, and the plunger P raised, and the rail R, with the pedestal or support A welded to it, is moved along the desired distance to have another pedestal welded to it in like manner.

While the machine herein described is illustrated as effecting the welding by means of the blow pipe or gas-blast it is obvious that electricity may be employed as the heating medium, the proper connections to the source of electricity being substituted for the gas burners. I therefore do not confine myself to heating by means of gas alone.

Having thus fully described my said invention, I claim—

1. In a welding machine the combination, with means to conduct heat to the articles to be welded at the welding point, of three plungers, two of which are constructed and adapted to exert a pressure against the article on two sides and the other to exert a vertical pressure.

2. In a welding machine, the combination with means to conduct heat to the articles to be welded at the welding point, of a vertical and two horizontal plungers constructed and adapted to exert a pressure against the articles to be welded.

3. In a welding machine, a pressure plunger provided with an end block and means for conveying to said end block heat of sufficient temperature to weld.

4. In a welding machine, the combination of pressure plungers provided with end blocks, and means for conveying heat of sufficient temperature to weld to the said end blocks.

5. In a welding machine, a pressure plunger provided with an end block and burners in said block and means adapted to admit gas to said burners.

6. In a welding machine, a pressure plunger provided with an end block and passageways in said block and means adapted to admit gas to said passageways.

7. In a welding machine, a pressure plunger provided with an end block having a cavity or cavities and means adapted to admit gas to said cavities.

8. In a welding machine, the combination of pressure plungers provided with end blocks, cavities in said blocks and means for conducting gas to said cavities and facing dies placed between the plungers and the article or articles to be welded.

9. In a welding machine, a pressure plunger provided with an end block formed with passageways.

10. In a welding machine, a pressure plunger provided with an end block formed with recesses opening at its front face.

11. In a welding machine, a pressure plunger provided with an end block formed with cavities opening on its front face and having extensions opening at the rear of said end block.

12. In a welding machine, in combination with a pressure plunger, a movable swaging block or facing die for imparting the pressure of the plunger to the article welded, said block or die being adapted to be readily moved in and out of position in front of the plunger.

13. In a welding machine, the combination of standards carrying supporting rollers, a furnace provided with a slot for the insertion of the article or articles to be welded, gas burners at intervals, divisions between said burners, and means to admit gas to said burners.

14. In combination with a welding machine, a furnace provided with a slot, gas burners at intervals, divisions between said burners and means to admit gas to said burners.

ARTHUR J. MOXHAM.

Witnesses:
A. J. BRYAN,
GEO. W. KING.